United States Patent [19]
Tamai et al.

[11] 3,892,212
[45] July 1, 1975

[54] INTEGRAL INTAKE AND EXHAUST CONDUIT FOR INTERNAL COMBUSTION ENGINE

[75] Inventors: Hisashi Tamai, Tokyo; Yoshitoku Iizuka, Toda, both of Japan

[73] Assignee: Honda Giken Kogyo Kabushiki Kaisha, Tokyo, Japan

[22] Filed: June 22, 1973

[21] Appl. No.: 372,746

[30] Foreign Application Priority Data
June 28, 1972 Japan.............................. 47-76212

[52] U.S. Cl............. 123/122 AB; 123/75 B; 165/52
[51] Int. Cl....................... F02b 19/10; F02b 19/18
[58] Field of Search... 123/122 A, 122 AB, 122 AC, 123/32 ST, 32 SP, 75 B, 52 M; 165/52

[56] References Cited
UNITED STATES PATENTS

| | | | |
|---|---|---|---|
| 1,170,337 | 2/1916 | Robinson | 165/52 |
| 1,289,868 | 12/1918 | Moreland | 165/52 |
| 1,777,472 | 10/1930 | Mock | 123/122 AB |
| 2,047,080 | 7/1936 | Maniscalco | 165/52 |
| 2,836,161 | 5/1958 | Primakoff | 123/122 A |
| 3,109,416 | 11/1963 | Rose | 123/122 AB |
| 3,659,564 | 5/1972 | Suzuki | 123/32 ST |
| 3,717,131 | 2/1973 | Chana | 123/122 AB |
| 3,741,180 | 6/1973 | Eichbaum | 123/122 A |
| 3,780,715 | 12/1973 | Flitz | 123/122 AC |
| 3,788,292 | 1/1974 | Lee | 165/52 |

*Primary Examiner*—Charles J. Myhre
*Assistant Examiner*—Ronald B. Cox
*Attorney, Agent, or Firm*—Lyon & Lyon

[57] ABSTRACT

An intake and exhaust pipe combination for an internal combustion engine of the type having a main combustion chamber supplied with a lean mixture and an auxiliary combustion chamber supplied with a rich mixture. A spark plug ignites the rich mixture in the auxiliary chamber and the resulting torch flame passes through a torch nozzle to ignite the lean mixture in the main chamber. The auxiliary intake passage which supplies the auxiliary combustion chamber with the rich air fuel mixture is integrally formed with the exhaust passage. A corrugated partition separates the two passages, forming a common wall there between. The corrugations on the partition retard the flow of mixture in the intake passage and provide excellent heat transfer to the mixture from the exhaust gas in the exhaust passage thereby improving vaporization of the fuel mixture for excellent starting performance and reducing harmful ingredients in the exhaust.

7 Claims, 2 Drawing Figures

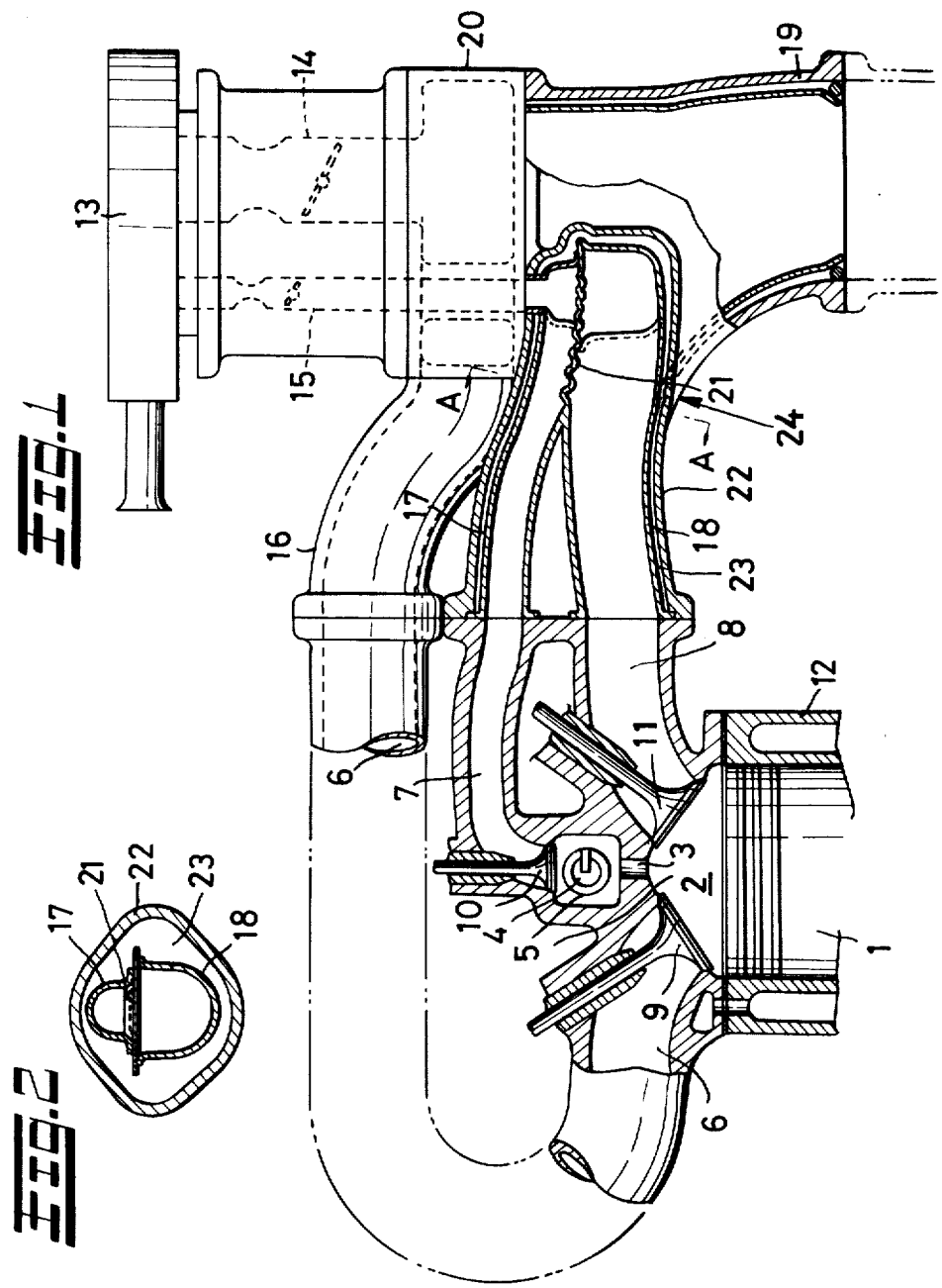

INTEGRAL INTAKE AND EXHAUST CONDUIT FOR INTERNAL COMBUSTION ENGINE

This invention relates to an intake and exhaust pipe configurations for internal combustion engines of the type having a main combustion chamber, an auxiliary combustion chamber and a torch nozzle connecting the two chambers. A spark plug ignites a rich mixture in the auxiliary chamber and the torch flame passes through the torch nozzle to ignite and burn the lean combustible mixture in the main chamber. When an engine of this type is started in a cold condition the rich mixture is cooled in the auxiliary intake passage as well as in the auxiliary combustion chamber and the fuel in the mixture tends to separate therefrom and adhere to the wall surfaces. As a result poor combustion occurs within the auxiliary combustion chamber resulting in a loss of fuel economy and an increase in unburned hydrocarbons which are then exhausted and become a major contributor to air pollution.

To minimize the unburned hydrocarbons which are emitted from the engine, it is necessary to obtain a more complete combustion within the auxiliary combustion chamber which can be achieved through improved fuel vaporization.

In accordance with this invention, a novel intake and exhaust pipe configuration is employed which utilizes the heat in the exhaust passage to improve the vaporization of the fuel mixture. Specifically, the auxiliary intake passage is integrally formed with the exhaust passage such that a corrugated partition separates the two passageways forming a common corrugated wall therebetween. The corrugations in the wall impede the flow of intake mixture along the auxiliary intake passage, during which time the heat is transferred from the exhaust gas in the exhaust passage through the corrugated partition to the incoming mixture thereby vastly improving the vaporization of the mixture and reducing the amount of unburned hydrocarbons emitted to the atmosphere.

The object of the present invention is to reduce the unburned hydrocarbons emitted from an internal combustion engine by improving the vaporization of the rich air fuel mixture in the auxiliary intake passage.

It is another object of this invention to obtain a more complete combustion in an internal combustion engine by heating the incoming rich air fuel mixture in the auxiliary intake passage to improve the vaporization of such mixture.

It is a further object of this invention to reduce the unburned hydrocarbons emitted from an internal combustion engine of the type having a main and auxiliary combustion chamber through the use of an integral auxiliary intake passage and exhaust passage wherein heat from the exhaust gasses in the exhaust passage can be readily transferred to the incoming air fuel mixture in the auxiliary intake passage.

It is yet another object of the present invention to provide an integral auxillary intake passage and exhaust for an internal combustion engine of the type having a main and auxiliary combustion chamber which impedes the flow of air fuel mixture in the auxiliary intake passage for the improved transfer of heat from the gasses in the exhaust passage to the incoming fuel in the intake passage.

These and other objects and advantages of the present invention will become apparent from the following detailed description taken in conjunction with the accompanying drawings.

FIG. 1 is a sectional side view of a portion of an internal combustion engine incorporating the integral auxiliary intake passage and exhaust passage.

FIG. 2 is a sectional view taken along line A-A in FIG. 1.

Referring now in detail to the drawings, the internal combustion engine is seen to have a main combustion chamber 2, a main intake passage 6 communicating therewith, an auxiliary combustion chamber 5 and an auxiliary intake passage 7 communicating with the auxiliary combustion chamber. A lean air fuel mixture is supplied to the main combustion chamber 2 through intake passage 6 and a rich air fuel mixture is supplied to the auxiliary combustion chamber 5 through the auxiliary intake passage 7. The auxiliary combustion chamber is in communication with the main combustion chamber through a torch nozzle 3. A spark plug 4 is provided in the auxliary chamber to ignite the rich mixture therein. The flame produced thereby is injected through the torch nozzle 3 into the main combustion chamber 2 to ignite the lean mixture therein.

The main combustion chamber 2 is provided with a main intake valve 9 and the auxiliary combustion chamber 5 communicates with the auxiliary intake passage 7 through an auxiliary intake valve 10. An exhaust valve 11 is shown disposed across the main combustion chamber from the main intake valve 9. The exhaust valve communicates the main combustion chamber with the exhaust passage 8. The exhaust passage in turn communicates with an exhaust pipe 18 and similarly the air intake passage 7 communicates with an auxiliary intake pipe 17. The intake pipe and exhaust pipes are disposed on the same side of the engine body 12 and form an integral intake and exhaust structure 24 having a corrugated partition wall 21 which extends between the intake and exhaust pipes 17 and 18. The corrugations in the partition wall are substantially perpendicular to the longitudinal axies of both pipes.

When the internal combustion engine above described is started from a cold condition, the heat of the exhaust gas traveling through the exhaust passage and exhaust pipe is transmitted through the corrugated partition 21 to the rich mixture passing through the auxiliary intake pipe 17 which is immediately heated and vaporized for complete combustion. The heat generated by the exhaust gases causes the partition 21 to be deformed by thermal expansion. The corrugations therein allow the wall to absorb the expansion thereby preventing possible damage to the intake and exhaust pipes. In addition, the flow intake mixture is somewhat retarded by striking the corrugated surface of the partition wall 21 during which period the heat exchange is thoroughly effected to improve the vaporization of the mixture thereby insuring excellent starting performance and reducing the unburned hydrocarbons which would otherwise be emitted to the air by the cold engine.

In the preferred embodiment of the invention, illustrated in FIGS. 1 and 2, the auxiliary intake pipe 17 and exhaust pipe 18 are constructed of a low thermal capacity material such as a thin sheet of metal for improving the heat conductivity. A shell 22 of cast pipe or the like is provided about the intake and exhaust structure 24 to reinforce the structure and retain heat therein to keep warm the auxiliary intake pipe 17. A heat insulating layer 23 such as an air gap or other heat insulating material is provided between the shell and intake and exhaust pipes as a further aid in heat retention.

To complete the understanding of the intake and exhaust structure 24, the main air intake passage 6 is shown in communication with a main intake pipe 16. The intake pipe 16 communicates with the main carburetor 14 through an intake chamber 20 which is disposed above the exhaust manifold 19 and below the air cleaner 13 and carburetors. The auxiliary intake pipe 17 also communicates with a carburetor 15 through the intake chamber 20. The intake chamber provides an enclosed area which is heated by the exhaust gases in the manifold and further aids in the vaporizing of the air fuel mixtures as they pass from the carburetors to the combustion chambers.

In an alternate embodiment of the invention [not shown] the auxiliary intake pipe 17 and exhaust pipe 18 are formed into a single cast pipe with a thin partitian plate defining a common wall between the two pipes. Other changes and modifications may be made in carrying out the instant invention without departing from the spirit and scope thereof. Insofar as these changes and modifications are within the purview of the appended claims they are to be considered as part of the invention.

We claim:

1. An integral intake and exhaust conduit for an internal combustion engine comprising means forming an intake passage for directing an air-fuel mixture to a combustion chamber, means forming an exhaust passage for emitting the exhaust from said engine, partition means disposed between said intake passage means and said exhaust passage means for transferring heat from said engine exhaust to said air-fuel mixture, said partition means having corrugations therein for impeding the flow of air-fuel mixture within said intake passage means while transferring heat thereo, said partition means being located at a distance from said engine, said intake passage means and said exhaust passage means being displaced from one another between said partition means and said engine, a housing, said intake passage means and said exhaust passage means being displaced within said housing and heat insulating means disposed within said housing and about said intake passage means and said exhaust passage means whereby the heat generated by said engine is retained within said housing, said intake passage means and said exhaust passage means being of low thermal capacity.

2. The combination of claim 1 wherein said means defining said intake passage comprises an air intake pipe, one end of said pipe communicating with said combustion chamber and the other end of said pipe communicating with a carburetor and said means defining said exhaust passage comprising an exhaust pipe, one end of said exhaust pipe communicating with said combustion chamber and the other end of said pipe communicating with an exhaust manifold, a portion of the other end of said exhaust pipe being integrally formed with said other end of said intake pipe to define said partition means.

3. The combination of claim 2 including means for supporting said intake pipe and said exhaust pipe within said housing, said pipes being disposed inwardly from said housing thereby defining an air gap between said housing and said pipes for retaining the heat generated by the engine exhaust within said housing.

4. The combination of claim 1 wherein said partition is constructed of a metal having a low thermal capacity.

5. An integral intake and exhaust conduit for an internal combustion engine of the type having a main combustion chamber, an auxiliary combustion chamber and a torch nozzle establishing communication therebetween, comprising in combination: means for supplying a fuel mixture to the conduit, said conduit comprising a housing, means defining an intake passage for directing a fuel mixture to said auxiliary combustion chamber, said means being disposed within said housing, means defining an exhaust passage for emitting the exhaust from said engine, said means being disposed within said housing, said intake and exhaust passages comprising thin wall metal pipes, a portion only of said exhaust passage being integrally formed with a portion of said intake passage defining a partition therebetween, said partition being located at a distance from said engine, said partition having corrugations therein for impeding the flow of fuel mixture within said intake passage while transferring heat generated by said engine exhaust to said fuel mixture.

6. An integral intake and exhaust conduit for an internal combustion engine of the type having a main combustion chamber, an auxiliary combustion chamber and a torch nozzle establishing communication therebetween, said conduit comprising a housing, means defining an intake passage for directing an air-fuel mixture to said auxiliary combustion chamber, said means being disposed within said housing, means defining an exhaust passage for emitting the exhaust from said engine, said means being disposed within said housing, a portion of said exhaust means being integrally formed with a portion of said intake means defining a partition therebetween, said partition having corrugations therein for impeding the flow of air-fuel mixture within said intake passage while transferring heat generated by said engine to said air-fuel mixture, said means defining said intake passage comprising an intake pipe, one end of said intake pipe communicating with said auxiliary combustion chamber and the other end of said pipe communicating with a carburetor and said means defining said exhaust passage comprising an exhaust pipe, one end of said exhaust pipe communicating with said main combustion chamber and the other end of said pipe communicating with an exhaust manifold, a portion of said other end of said pipe being integrally formed with said other end of said intake pipe thereby defining said partition, means for supporting said intake pipe and said exhaust pipe within said housing said pipes being disposed inwardly from said housing thereby defining an air gap between said housing and said pipes for retaining the heat generated by the engine exhaust within said housing, said partition being constructed of a metal having a low thermal capacity.

7. An intake and exhaust system for an internal combustion engine, comprising, in combination: means providing an intake passage to the engine, means providing an exhaust passage from the engine, said passages each being of thin walled metallic construction of low thermal capacity, means for supplying an air-fuel mixture to the intake passage, partition means disposed between said intake passage and said exhaust passage for transferring heat from the engine exhaust gases to the air-fuel mixture in the intake passage, said partition means comprising a corrugated metal sheet having low thermal capacity, the corrugations of the sheet being perpendicular to the direction of flow of the air-fuel mixture, said partition means being located downstream from the supply means, and being located at a distance from said engine along said intake passage and said exhaust passage, said intake passage and exhaust passage being spaced from one another near the engine, and a shell extending about and spaced from said intake passage and exhaust passage, said shell providing an air chamber for insulating said intake and exhaust passages.

* * * * *

UNITED STATES PATENT AND TRADEMARK OFFICE
CERTIFICATE OF CORRECTION

PATENT NO. : 3,892,212
DATED : July 1, 1975
INVENTOR(S) : Hisashi Tamai, Yoshitoku Iizuka It is certified that error appears in the above-identified patent and that said Letters Patent are hereby corrected as shown below:

Col. 1, line 4, before "intake" delete "an".

Col. 1, line 11, delete "combustible".

Col. 1, line 60, after "haust" insert --passage--.

Col. 3, line 19, change "tian" to read --tion--.

Signed and Sealed this fourteenth Day of October 1975

[SEAL]

Attest:

RUTH C. MASON
*Attesting Officer*

C. MARSHALL DANN
*Commissioner of Patents and Trademarks*